(12) United States Patent
Oleson et al.

(10) Patent No.: US 9,197,109 B2
(45) Date of Patent: Nov. 24, 2015

(54) ELECTRIC MOTOR CONFIGURED FOR FACILITATED WASHABILITY

(75) Inventors: John Christen Oleson, Placitas, NM (US); Andrew David Cook, Albuquerque, NM (US)

(73) Assignee: Stainless Motors, Inc., Rio Rancho, NM (US)

( * ) Notice: Subject to any disclaimer, the term of this patent is extended or adjusted under 35 U.S.C. 154(b) by 361 days.

(21) Appl. No.: 13/415,723

(22) Filed: Mar. 8, 2012

(65) Prior Publication Data

US 2013/0234541 A1 Sep. 12, 2013

(51) Int. Cl.
| | |
|---|---|
| *H02K 9/04* | (2006.01) |
| *H02K 5/12* | (2006.01) |
| *H02K 5/124* | (2006.01) |
| *H02K 9/14* | (2006.01) |
| *H02K 15/00* | (2006.01) |

(52) U.S. Cl.
CPC ............... *H02K 5/12* (2013.01); *H02K 5/124* (2013.01); *H02K 9/14* (2013.01); *H02K 15/00* (2013.01)

(58) Field of Classification Search
CPC ............ H02K 9/06; H02K 5/20; H02K 9/19; H02K 5/12; H02K 15/00; H02K 9/14; H02K 5/124
USPC ....................................................... 310/54, 58
See application file for complete search history.

(56) References Cited

U.S. PATENT DOCUMENTS

| | | | | |
|---|---|---|---|---|
| 2,032,552 | A * | 3/1936 | Seyfried ........................... | 310/66 |
| 2,683,823 | A * | 7/1954 | Wightman et al. .............. | 310/52 |
| 2,838,262 | A * | 6/1958 | Anderson ...................... | 248/603 |
| 3,441,762 | A * | 4/1969 | Luenberger et al. .......... | 310/157 |
| 3,780,397 | A * | 12/1973 | Harbeck et al. ................. | 15/413 |
| 4,361,001 | A * | 11/1982 | Almond et al. ................ | 56/12.8 |
| 4,564,780 | A * | 1/1986 | Nel ......................... | 310/216.125 |
| 5,101,128 | A * | 3/1992 | Veronesi et al. ................ | 310/54 |
| 5,492,458 | A * | 2/1996 | Horng ......................... | 417/423.7 |
| 6,183,208 | B1 * | 2/2001 | Qandil et al. .................. | 417/201 |
| 6,606,866 | B2 * | 8/2003 | Bell .................................. | 62/3.7 |
| 6,700,235 | B1 * | 3/2004 | McAfee .......................... | 310/52 |
| 7,178,344 | B2 * | 2/2007 | Bell ................................. | 62/3.7 |
| 7,419,368 | B2 | 9/2008 | Milks | |

(Continued)

FOREIGN PATENT DOCUMENTS

| | | | | |
|---|---|---|---|---|
| EP | | 633647 A1 * | 1/1995 | ............... H02K 5/24 |
| JP | | H0988895 A | 3/1997 | |

(Continued)

OTHER PUBLICATIONS

Translation of foreign document JP 09088895 (Year: 1997).*

(Continued)

*Primary Examiner* — Alex W Mok
(74) *Attorney, Agent, or Firm* — Fitch, Even, Tabin & Flannery LLP

(57) ABSTRACT

An electric motor having a casing positioned between a head end cap and a tail end cap is provided. An output shaft passes through the head end cap and the tail end cap and a cooling fan is mounted for rotation relative to the output shaft. The electric motor includes a fluid distribution chamber adjacent the tail end cap, an inlet port for supply of fluid to the chamber, and a plurality of discharge apertures for distributing fluid from the chamber toward the cooling fan. The fluid distribution chamber facilitates the washing and cleaning of the electric motor.

25 Claims, 5 Drawing Sheets

(56) References Cited

U.S. PATENT DOCUMENTS

| | | | |
|---|---|---|---|
| 7,586,236 B2 * | 9/2009 | Corsaro et al. | 310/322 |
| RE44,272 E * | 6/2013 | Bell | 62/3.7 |
| 2002/0149273 A1* | 10/2002 | Soitu et al. | 310/58 |
| 2003/0042804 A1* | 3/2003 | Cook et al. | 310/51 |
| 2004/0113500 A1* | 6/2004 | Casey et al. | 310/58 |
| 2005/0035673 A1* | 2/2005 | Lafontaine et al. | 310/58 |
| 2008/0100174 A1* | 5/2008 | Stahlhut et al. | 310/268 |
| 2008/0185205 A1* | 8/2008 | Kaminokado | 180/220 |
| 2010/0155401 A1* | 6/2010 | Cook | 220/203.01 |

FOREIGN PATENT DOCUMENTS

| | | |
|---|---|---|
| JP | 2002126669 A | 5/2002 |
| JP | 2007020258 A | 1/2007 |
| WO | 2005041388 A1 | 5/2005 |

OTHER PUBLICATIONS

International Search Report, date of mailing Jun. 27, 2013 for PCT/US2013/029970 (3 pgs.).
Written Opinion, dated Jun. 26, 2013 of the International Search Report for PCT/US2013/029970 (4 pgs.).

* cited by examiner

ELECTRIC MOTOR CONFIGURED FOR FACILITATED WASHABILITY

FIELD

An electric motor is described herein and, in particular, an electric motor configured for facilitating washing and cleaning.

BACKGROUND

Electric motors are often used to drive mixers or pumps in pharmaceutical, chemical, and food processing applications. Such electric motors are routinely exposed to debris which can accumulate within the motor and, if not properly cleaned, can lead to undesirable results such as cross-contamination, dirt accumulation, and/or bacterial growth. As a result, electric motors used at food processing, pharmaceutical, and biotech facilities can be subjected to frequent sanitation-required wash downs in order to remove undesired residue from product debris, cleaning reagents, soils, and the like.

A typical electric motor can have a housing including a cylindrical casing and a pair of end caps. The motor can include a rotor attached to a shaft and a stator surrounding the rotor. One end of the shaft can extend through one of the end caps for attachment to operating equipment, such as a mixer or pump. An opposite end of the shaft can extend through the other of the end caps and can have a fan attached thereto for purposes of providing circulation for cooling the motor. A fan shroud may be attached to the other of the end caps for covering the fan.

Electric motors as described above can include complex geometries that can render the motors difficult to wash and clean. Partial disassembly, such as removal of the fan shroud, can be necessary in order to access the fan for cleaning. Even after removal of the shroud, the electric motor can be difficult to clean. For example, fan shrouds mounted on the casing using sheet metal brackets or localized deformation in combination with machine screws can result in significant crevices that can accumulate and retain undesired residues. Similarly, cooling fans, which are frequently made of plastic and have numerous pockets or crevices as part of their design and are secured to a knurled shaft surface, result in crevices and surfaces that can be difficult to properly clean and provide multiple surfaces for undesired particles to accumulate. In some instances, the complex exterior geometries of the electric motors can result in hard-to-reach areas, such as within a fan shroud, where debris can be difficult to remove, a particular disadvantage in applications in the food, biotech, and pharmaceutical industries.

SUMMARY

An electric motor configured for easy washing and cleaning is provided that includes an internal washing assembly, an improved attachment mechanism for the fan shroud, and/or a fan configured for ease of cleaning. The internal washing assembly includes a fluid distribution chamber with discharge apertures from which a cleaning fluid can be emitted to wash and clean the cooling fan and fan shroud. The internal washing assembly allows for cleaning from the inside outward, as opposed to typical prior motors which required cleaning from the outside inward. The internal washing assembly can advantageously wash and clean the cooling fan and fan shroud without requiring removal of the fan shroud. The attachment mechanism for the fan shroud includes nonmetallic spacers between the fan shroud and the casing and/or tail end cap that allow the fan shroud to be mounted without intermediary metallic components or deformations of the fan shroud. To facilitate ease of cleaning the fan, the electric motor includes a tapered output shaft to cooling fan interface and an end cap configured to prevent a threaded or splined end of the shaft from protruding and improved cooling fan having a hub and vanes configured to reduce the surfaces where debris can accumulate.

The electric motor includes a casing positioned between a head end cap and a tail end cap. An output shaft passes through the head end cap and the tail end cap, and a cooling fan is mounted for rotation relative to the output shaft. The motor includes a fluid distribution chamber adjacent the tail end cap and an inlet port to permit a supply of fluid to the chamber. The motor further includes a plurality of discharge apertures for distributing fluid from the chamber toward the cooling fan.

The output shaft can include a tapered portion and the cooling fan can include a complementary tapered bore configured to receive the tapered portion of the output shaft such that the cooling fan can be mounted on the output shaft. The motor can include a means for limiting rotational movement of the output shaft and the cooling fan relative to each other. A means for sealing the tapered bore of the cooling fan around the tapered portion of the output shaft can be also provided.

The electric motor can include a plate removably coupled relative to the tail end cap adjacent the fluid distribution chamber. The plate can have a plurality of discharge apertures for distributing fluid from the chamber toward the cooling fan. The plate can be positioned between the tail end cap and the cooling fan.

The motor can further include a cooling fan having upper and/or lower surfaces that are planar. The upper and lower surfaces of the cooling fan may also be parallel to one another. The fan can include a plurality of vanes having a major axis that is perpendicular to a longitudinal axis of the output shaft and a minor axis that is parallel to the longitudinal axis of the output shaft.

The motor can also include a fan shroud mounted relative to the casing and enclosing the fan and the tail end cap. A plurality of spacers can be positioned between the fan shroud and an exterior surface of the end cap. The spacers can have a continuously curved perimeter.

A method of washing the electric motor is also provided. The method includes injecting a cleaning fluid into the fluid distribution chamber. The method further includes distributing the fluid from the chamber through the discharge apertures toward the cooling fan to wash the cooling fan.

DETAILED DESCRIPTION OF THE DRAWINGS

An electric motor is provided that is configured for easy washing and cleaning and for restricting debris accumulation. The electric motor advantageously comprises an internal washing assembly having a fluid distribution chamber with an inlet port and a plurality of discharge apertures from which a cleaning fluid can be emitted to wash and clean the cooling fan and the fan shroud. The electric motor also includes non-metallic fan shroud standoffs that allow the fan shroud to be mounted on the casing without the need for intermediary metallic components or multiple deformations of the fan shroud. The electric motor further includes an improved output shaft to cooling fan interface and an end cap to allow the cooling fan to be mounted onto the output shaft without a splined end of the shaft protruding from the fan and providing good surfaces and crevices for debris to accumulate. In addition, the electric motor includes an improved cooling fan having a planar configuration and reduced width vanes to eliminate unnecessary pockets and crevices and reduce the surface area where debris can accumulate.

Figure 1:
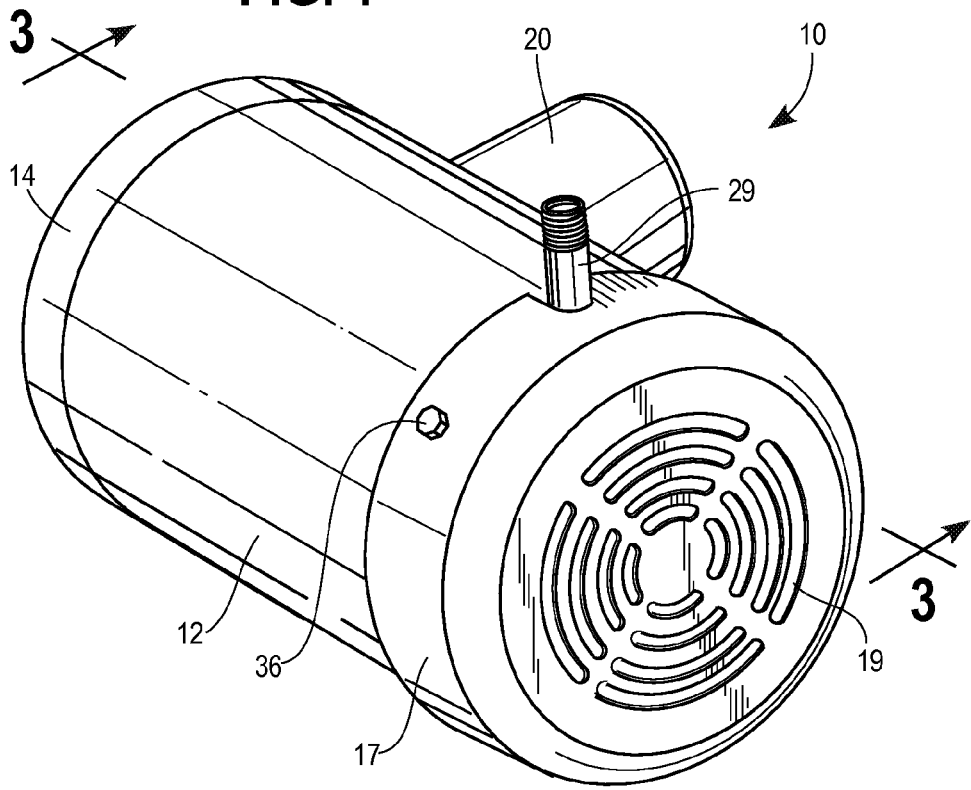
FIG. 1 is a perspective view of an electric motor showing a casing, a head end cap, a fan shroud, a terminal box, and a fluid conduit extending from a side of the housing.
Figure 2:
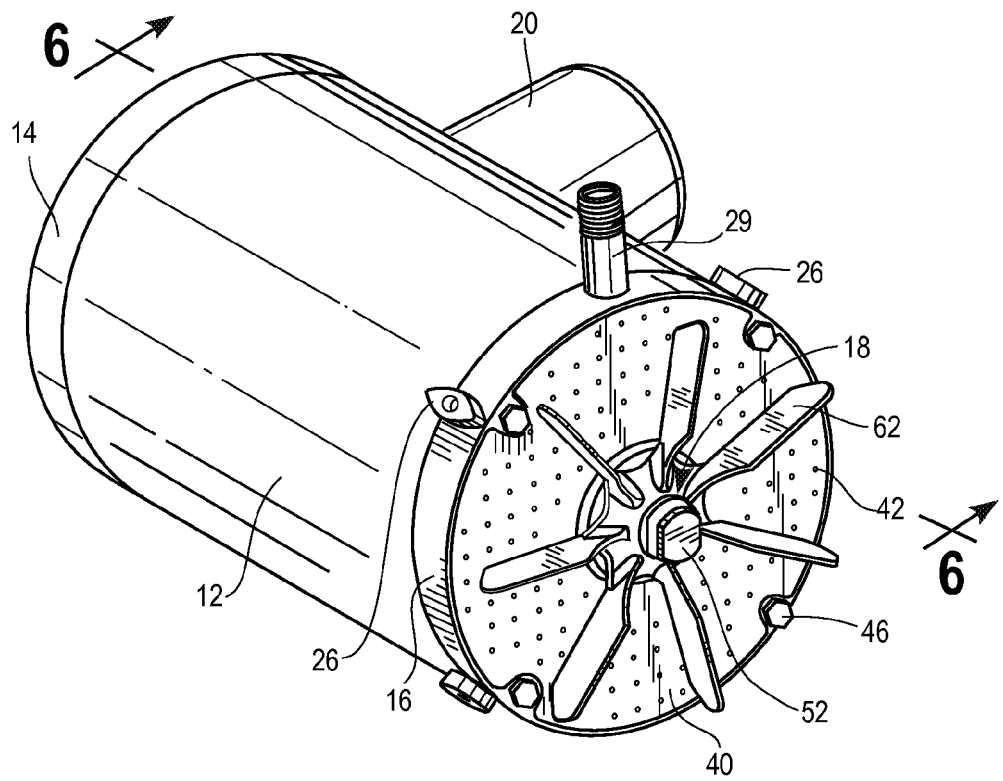
FIG. 2 is a perspective view of the electric motor of FIG. 1, showing the electric motor with the fan shroud removed to reveal the cooling fan and an apertured plate associated with a tail end cap.

With reference to FIGS. 1 and 2, an electric motor 10 has a housing that includes a cylindrical casing 12 with a head end cap 14 disposed at one end thereof and a tail end cap 16 disposed at an opposite end thereof. Disposed within the housing are a rotor 80 attached to an output shaft 30 and a stator 90 which surrounds the rotor 80. The rotor 80 can be attached to the output shaft 30 for rotation therewith, and the stator 90 can be attached to inner-facing surfaces of the end caps 14 and 16.

A fan shroud 17 is attached to the tail cap 16 to enclose a cooling fan 18 that is driven by the rotation of the output shaft 30. The fan shroud 17 can include a plurality of openings 19 that permit air generated by the cooling fan 18 to pass therethrough. A terminal box 20 is attached to the exterior of the casing 12 and provides for an electrical connection to the rotor 80 and/or stator 90. The motor 10 may include feet attached to the underside of the casing 12 for use in mounting the motor 10 to a surface. Interior surfaces of the head and tail end caps 14 and 16 may include raised ribs or fins for dissipating heat.

Figure 4:
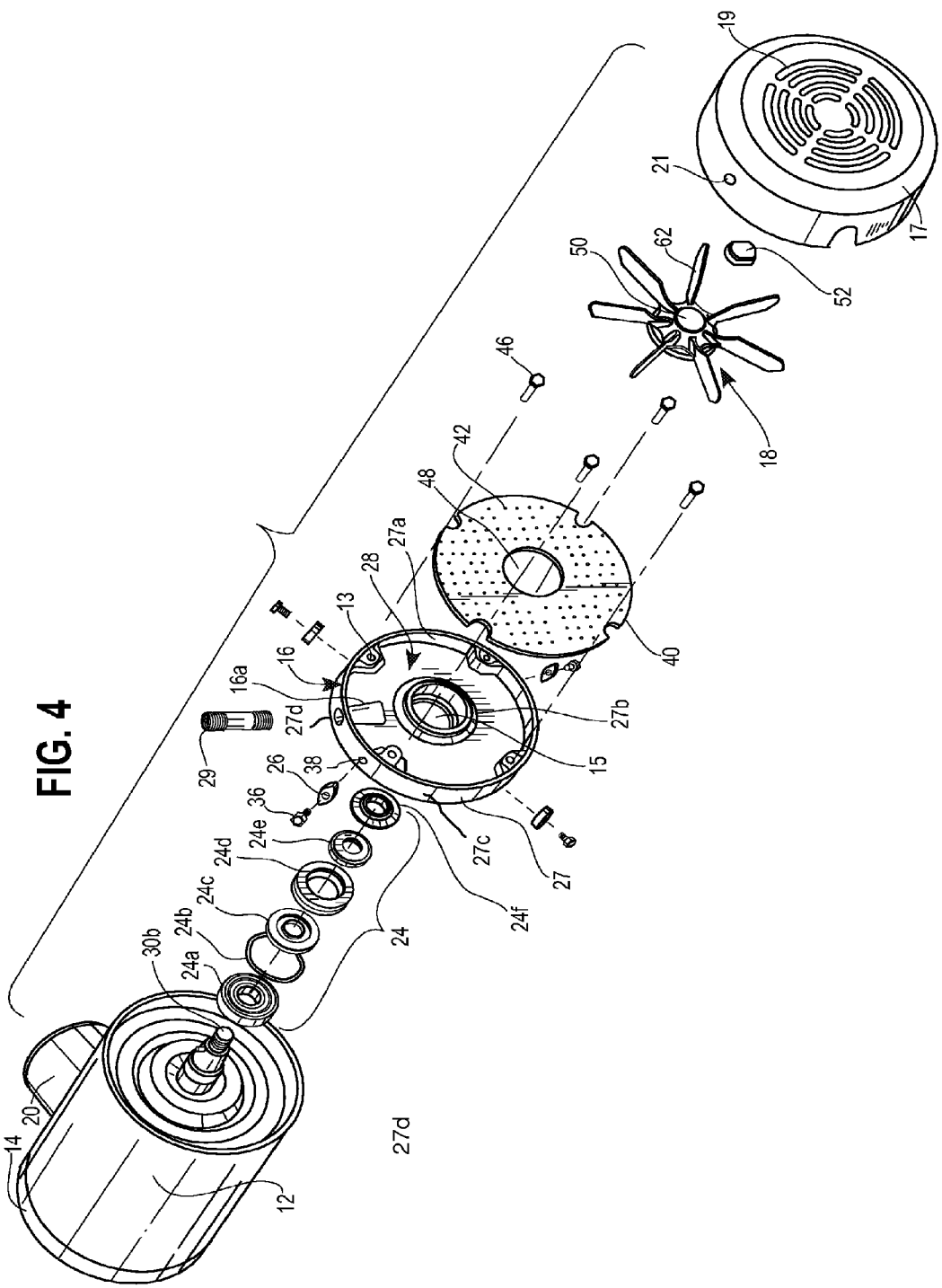
FIG. 4 is a partially exploded perspective view of the electric motor of FIG. 1.
Figure 6:
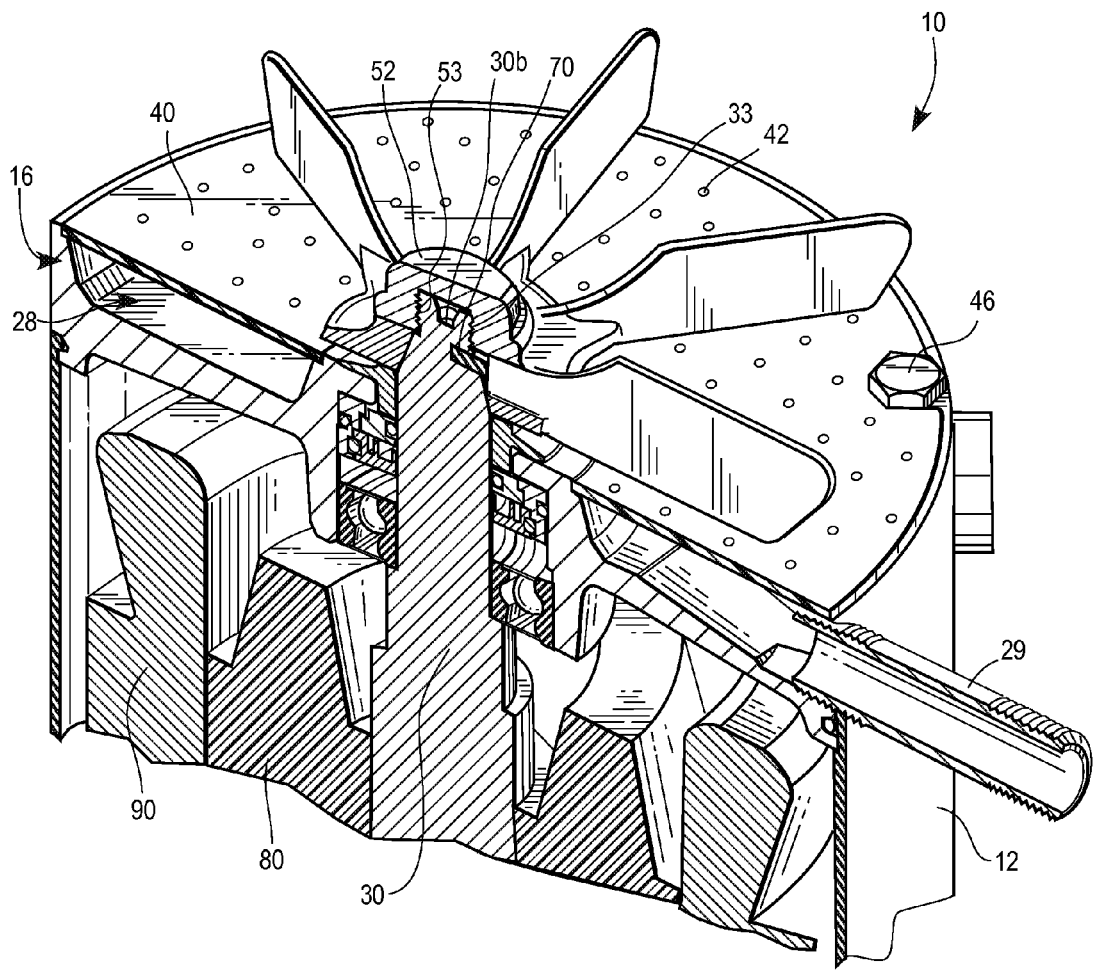
FIG. 6 is perspective cutaway view of the electric motor along line 6-6 of FIG. 1.

With reference to FIGS. 4 and 6, the tail end cap 16 can be annular. A fluid distribution chamber 28 is disposed adjacent to the tail end cap 16 for advantageously permitting an injection of cleaning fluid into the interior of the motor 10 for washing of the motor 10 without partially disassembling the motor 10. The fluid distribution chamber 28 can have an inlet port 27d to permit a cleaning fluid to be injected into the chamber 28. The inlet port 27d can be formed in an exterior surface 27c of the tail end cap 16. The inlet port 27d may have internal threads as shown in FIG. 6 to permit a fluid conduit 29 having an end with complementary threads to be coupled to the inlet port 27d. It is to be appreciated that the fluid conduit 29 may be formed integrally with the tail end cap 16 instead of being removably attached to the tail end cap 16. An indentation 16a can be formed in the tail end cap 16 adjacent the inlet port 27d to facilitate flow of the incoming fluid from the fluid conduit 29. The fluid conduit 29 can have another end that can be coupled via a threaded or snap-on connection to a hose attached to a suitable cleaning fluid source. The fluid may be water, a chemical reagent mixture, or any other fluid suitable for washing and/or rinsing the cooling fan 18.

A plate 40 having a plurality of apertures 42 and a central opening 48 can be removably attached relative to the tail end cap 16 to define the fluid distribution chamber 28 between the tail end cap 16 and the plate 40. For example, the apertured plate 40 can include a plurality of indents 44 as shown in FIG. 4. Screws 46, bolts, or other fasteners (hereinafter referred to as "screws") can pass through the indents 44 of the plate 40 and into the screw holes 13 of the tail end cap 16 to attach the apertured plate 40 to the tail end cap 16. With the plate 40 attached to the end cap 16, the fluid distribution chamber 28 can be enclosed between the tail end cap 16 and the apertured plate 40 as shown in FIG. 6. Apertures 42 of the plate 40 provide the fluid distribution chamber 28 with discharge apertures for distributing fluid from the chamber 28 toward the cooling fan 18 to wash the fan 18. It is to be appreciated that instead of having an attached plate 40, the tail end plate 16 may optionally be formed as a unitary structure enclosing the fluid distribution chamber 28 and having a side wall with a plurality of discharge apertures 42. The tail end cap 40, the apertured plate 40, and the screws 46 can be made from stainless steel or any other suitable metal.

The apertures 42 of the plate 40 can be sized and in a pattern for particular applications, including being sized and in a pattern selected with a desired discharge pressure. For example, the apertures 42 can be between about 0.03 and 0.1 inches in diameter, although other dimensions can be used depending upon the particular requirements for a given application. Likewise, the internal pressure in the chamber 28 can vary depending upon the application, and can be between about 100 and 600 psi for certain applications.

Figure 3:
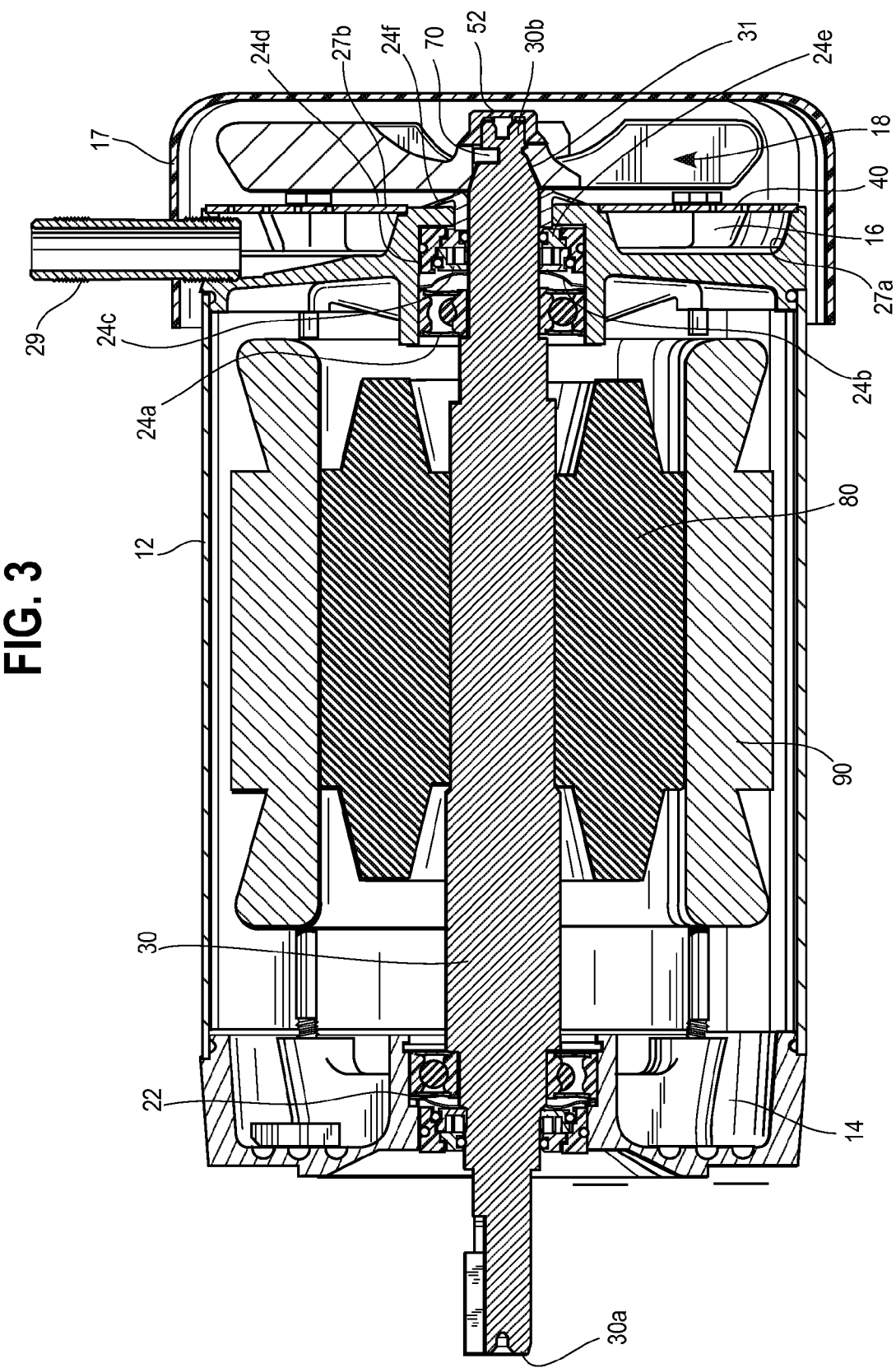
FIG. 3 is a side sectional view of the electric motor of FIG. 1 taken along line 3-3 of FIG. 1.

The interior surfaces of the tail end cap 16 can be configured to promote drainage, and can be adapted to promote drainage in a variety of orientations of the motor 10 about its longitudinal axis. For example, an outer circumferential wall 27 of the tail end cap 16 can have an inner surface 27a, as shown in FIG. 3, with a radially outward taper. This taper of the inner surface 27a can facilitate drainage of liquid from within the chamber 28, particularly when the chamber 28 is no longer pressurized. Similarly, a central opening 15 in the tail end cap 16 can also include an outer surface 27b with a radially outward taper to facilitate drainage.

With reference to FIGS. 3 and 4, a drive end 30a of the output shaft 30 can extend through a central opening of the head cap 14 and an opposite tail end 30b of the output shaft 30 can extend through the central opening 15 of the tail end cap 16. The drive end 30a of the output shaft 30 can be configured for connection to other equipment, such as a mixer or pump, for imparting rotational movement to components thereof. The outwardly-facing surface of the head cap 14 may include internally-threaded blind taps to facilitate attachment of the motor 10 to other equipment.

The output shaft 30 can be supported for rotation relative to the head cap 14 and the tail cap 16 using a pair of axially spaced bearings or the like. One or more seal and bearing assemblies 22 and 24 can surround the drive end 30a and the tail end 30b of the output shaft 30, respectively, and are seated within annular recesses of the head cap 14 and the tail cap 16, respectively, for sealing the openings of the caps 14 and 16 through which the shaft 30 extends.

In order to isolate the interior of the casing 12 from the external environment, and in particular, to prevent the cleaning fluid injected through the inlet port 27d into the fluid distribution chamber 28 from flowing into the interior of the casing 12, the seal and bearing assembly 24 at the tail end cap 16 can include multiple components. These components can include a ball bearing assembly 24a, a multi-component mechanical sealing assembly (components 24c, 24d, and 24e) and a slinger seal 24f, as illustrated in FIGS. 3 and 4. The multi-component mechanical sealing assembly includes a rotor component 24e configured to rotate with the shaft 30 and a stator component 24c and an adapter component 24d configured to be fixed relative to the tail end cap 16. Relative rotation can occur between the stator component 24 and the stator component 24c and adapter component 24d, while providing a degree of isolation from the ball bearing assembly 24a. An example of such a multi-component mechanical sealing assembly is available from Isomag Corporation (Baton Rouge, La.).

The slinger seal 24f is used to protect the ball bearing assembly 24a and the multi-component mechanical sealing assembly from fluid in the fluid distribution chamber 28. The inclined annular surface of the slinger seal 24f is angled such that it can "sling" fluid away from the center portion of the tail end cap 16 as well as promote drainage of fluid. The slinger seal 24f is also used to eliminate crevices (and metal to metal contact) between the fan 18 and the shaft 30 and, in particular, between the rotor component 24e and the fan 18. During normal operation, the slinger seal 24f rotates with the shaft 30, fan 18 and rotor component 24e. However, the slinger seal 24f can also be used to provide additional motive or torque capacity to the rotor component 24e. For instance, if an O-ring between the rotor component 24e and shaft 30 fails, the slinger seal 24f can provide a back-up source for torque transfer between the shaft 30 and the rotor component 24e. The slinger seal 24f can be made of any suitable component, such as an ethylene propylene diene monomer (EPDM).

With reference to FIGS. 3 and 6, the tail end 30b of the output shaft 30 is configured for coupling to and driving the cooling fan 18 in order to provide for circulation to cool the motor 10 during operation. In particular, the cooling fan 18 can include a central bore 50 having a taper. The tail end 30b of the output shaft 30 can include a tapered portion 31 complementary to the tapered central bore 50 of the cooling fan 18. As such, the cooling fan 18 can be mounted on the output shaft 30 via a friction fit between the tapered portion 31 of the output shaft 30 and the tapered central bore 50. The friction fit between the tapered output portion 31 of the output shaft 30 and the tapered central bore 50 eliminates crevices between the output shaft 30 and the cooling fan 30, preventing accumulation of undesired particles or residues in the central bore 50 as compared to currently used shafts and fans that are coupled using threaded or splined connections that result in multiple exposed surfaces that can accumulate and retain various debris.

The output shaft 30 extends through the central openings 15, 48, and 50 of the tail end cap 16, apertured plate 40, and cooling fan 18, respectively, as shown in FIGS. 3, 4, and 6. The tail end 30b of the output shaft 30 can protrude from the central bore 50 of the cooling fan 18 and include a threaded portion 33, as shown in FIGS. 4 and 6. A nut or cap 52 having matching threads 53 can be coupled to the threaded portion 33 to cover the tail end 30b of the output shaft 30 as shown in FIGS. 3 and 6. The cap 52 can be made of stainless steel and advantageously prevents the output shaft 30 from having an exposed tail end with protruding threads or splines that can provide surfaces for undesired residues and dirt to accumulate.

An anti-rotation mechanism can be provided to handle the torque of the cooling fan 18 and restrict or prevent rotational motion of the output shaft 30 and the cooling fan 18 relative to each other. In particular, the mechanism can be an assembly that includes a retaining aperture formed in the tapered portion 31 of the shaft 30, a groove 72 formed in the cooling fan 18 and aligned with the retaining aperture of the output shaft 30, and a pin 70 having one end configured to be retained in the retaining aperture of the shaft 30 and an opposite second end configured to be retained in the groove 72 of the cooling fan 18. The groove 72 can have one or more planar surfaces configured to permit the pin 70 to be retained therein in a friction fit. The pin 70 can be a push-down pin to permit the cooling fan 18 to be mounted by sliding onto the output shaft 30 until the pin 70 snaps into the groove 72 of the cooling fan 18.

Figure 5:
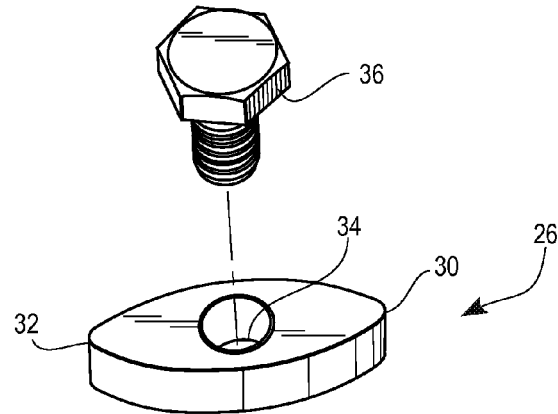
FIG. 5 is an enlarged perspective view of a fan shroud standoff and a fastener usable to secure the fan shroud to a tail end cap.

The fan shroud 17 can be mounted relative to the casing 12 via a plurality of spacers 26. The spacers 26 can be fan shroud standoffs having a generally elliptical shape, as shown in FIGS. 2 and 5. With reference to FIG. 5, a spacer 26 can include a first end 30, a second end 32 opposite the first end, and an opening 34. The opening 34 has been shown as being central, but can be offset from the center of the spacer 26. The opening 34 can permit a screw 36 to pass therethrough.

With reference to FIG. 4, the tail end cap 16 can have a plurality of screw holes 38 formed in its exterior surface. The spacers 26 can be positioned around the exterior surface of the end cap 16 such that the opening 34 of each spacer 26 can be aligned with a respective screw hole 38 of the tail end cap 16. The fan shroud 17 can be positioned over the spacers 26 such that the apertures 21 of the fan shroud 17 are aligned with the openings 34 of the spacers 26 and the screw holes 38 of the tail end plate 16 such that the screws 36 can pass through the apertures 21, the openings 34, and the screw holes 38 to secure the fan shroud 17 to the tail end plate 16 as shown in FIG. 1. As such, the fan shroud 17 of the electric motor 10 can be advantageously mounted onto the tail end cap 16 and/or the casing 12 unlike the commonly used fan shrouds that utilize auxiliary metallic brackets providing numerous crevices and metal-to-metal surfaces for debris to accumulate. Furthermore, unlike the commonly used shrouds, the fan shroud 17 does not require detents or dimples in its exterior surface (which also create the aforementioned undesired metal-to-metal interfaces) and can have a substantially constant outer diameter that provides even spacing between the fan shroud 17 and the casing 12 to allow air generated by the cooling fan 18 to uniformly exit from within the fan shroud 17.

With reference to FIG. 5, the spacer 26 can have continuously curved perimeter portions. As shown in FIG. 5, the width of the spacer 26 can increase from the first and second ends 30, 32 in a direction along the major axis of the spacer 26 toward a middle of the spacer 26. The spacer 26 can have a maximum width as measured on a minor axis transverse to the major axis and bisecting a length of the spacer 26 into two segments of equal lengths. The spacer 26 can have upper and lower surfaces having a shape that conforms to the underside of the fan shroud 17 and the exterior surface of the end cap 16, respectively. In particular, the upper and lower surfaces of the spacers 26 can be curved in a direction along the minor axis of the spacer 26.

Instead, the reduced width of the spacers 26 at the first and second ends 30 and 32 and the curvature of the sides of the spacers 26 provide contours that can direct air flow in a desired direction. Moreover, the spacers 26 can provide a substantially crevice-free interface between the tail end cap 16 and the fan shroud 17 to restrict or prevent accumulation of undesired particles or residues between the fan shroud 17 and the tail end cap 16. The spacers 26 can be made of a rubber material, for example EPDM (ethylene propylene diene monomer). It is to be appreciated that the material from which the spacers 26 are made can be any suitable material that would be resistant to corrosion or deformation upon repeated exposure to water, vapor, hot air, chemical cleaning agents, or the like.

With reference to FIGS. 4 and 5, the screws 36 and 46 can have an enlarged head attached to a threaded shaft. Optionally, the screws 36 and 46 can have countersunk, flat heads that are configured to fit into countersinks formed in the spacers 26 and the tail end cap 16 and surrounding the screw holes 34 and 13, respectively.

Figure 7:
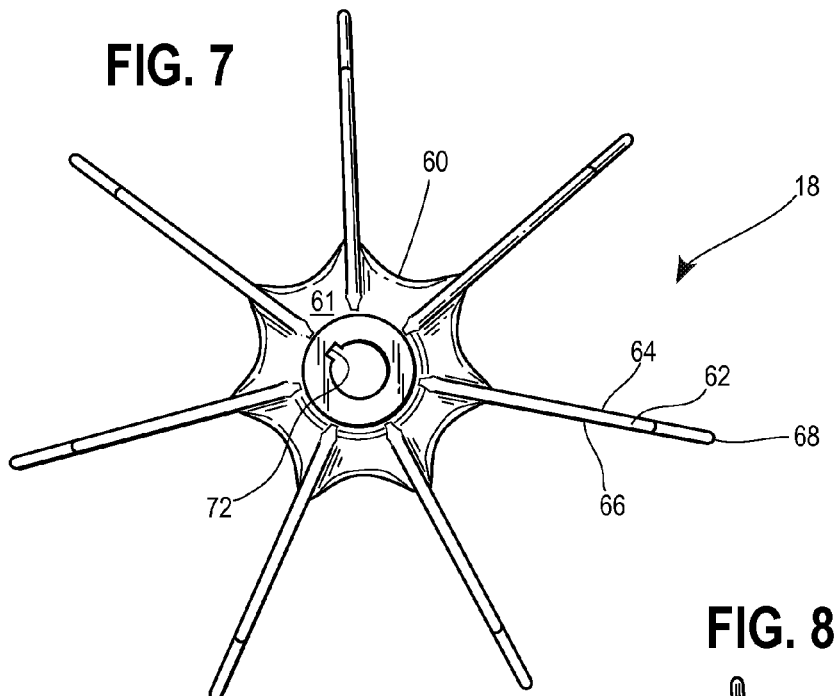
FIG. 7 is a front elevational view of the cooling fan of FIG. 2.
Figure 8:
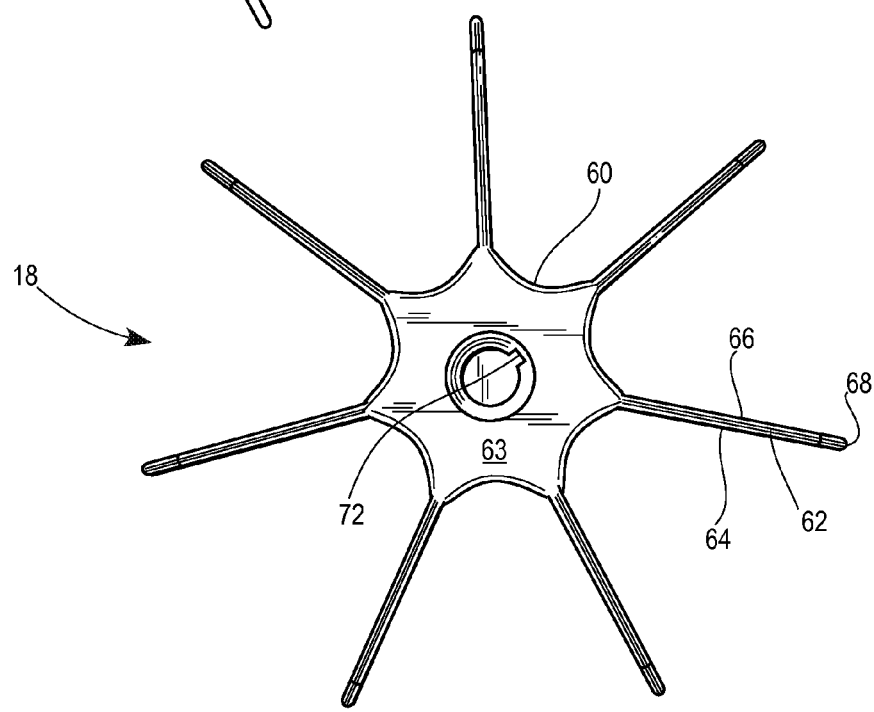
FIG. 8 is a rear elevational view of the cooling fan of FIG. 2.
Figure 9:
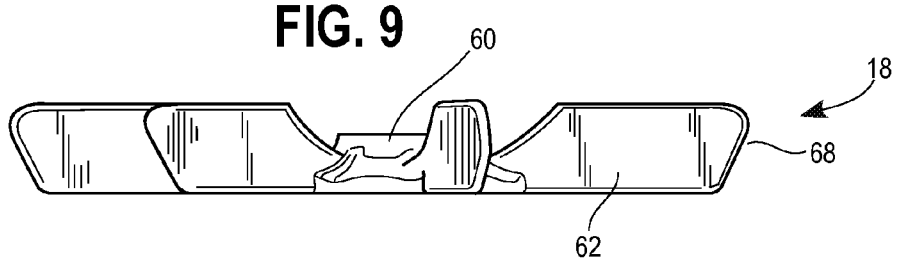
FIG. 9 is a side elevational view of the cooling fan of FIG. 2.

With reference to FIGS. 7-9, the cooling fan 18 can have a hub 60 with a plurality of vanes 62 extending radially therefrom. The hub 60 has an upper surface 61 and a lower surface 63, one or both of which may be at least in part planar. More specifically, one or both of the upper and lower surfaces 61 and 63 of the fan 18 can be entirely smooth and without any crevices to restrict or prevent accumulation of undesired residues on the fan 18. As shown in FIGS. 7 and 8, the outer edges of the hub 60 extending between and interconnecting the vanes 62 can be curved and smooth in contrast to the typical flat sharp edges of the commonly used plastic and metallic fans that facilitate accumulation of debris in and around their hubs.

With reference to FIG. 9, the lower surface 63 of the hub 60 and the lower-most surfaces of the vanes 62 can lie entirely in one plane. The upper surface 61 of the hub 60 and the upper-most surfaces of the vanes 62 can be parallel to each other. The upper and lower surfaces 61 and 63 of the fan 18 also can be parallel to each other. Such geometry of the fan 18 provides an advantage over existing fans having multiple crevices and/or pockets that can provide multiple surfaces for accumulation of chemicals or bacteria. The cooling fan 18 can be made of metal, for example stainless steel.

Each vane 62 of the fan 18 can have a first side 64 and a second side 66. The first and second sides 64 and 66 can be linear in a direction from the hub 60 toward a distal end 68 of the vane 62. As shown in FIG. 6, the vanes 62 can be oriented such that the first and second sides 64 and 66 are perpendicular to the apertured plate 40 unlike the currently used cooling fans that commonly have wide and curved vane surfaces that facilitate accumulation of debris. The vanes 62 can have a major axis that is generally perpendicular to the longitudinal axis of the output shaft 30 and a minor axis that is parallel to the longitudinal axis of the output shaft 30. The vanes 62 can be provided in a variety of different sizes, depending upon the cooling requirements for different sizes and applications of the motors. For example, the overall diameter of the fan 18 can be between about 5.5 and 12 inches in diameter. Further, the number of vanes 62 can also vary. For example, there can be between 7 and 9 vanes 62. The dimensions of the vanes 62 advantageously result in a thin vane profile that provides the least possible surface area that could allow accumulation of undesired residues on the vanes 62.

A method of washing down the motor 10 and cooling fan 18 is also provided. To wash down the motor 10 and cooling fan 18, a fluid source, for example, a hose (not shown) can be attached to the fluid conduit 29. A pressurized cleaning fluid such as water or a cleaning reagent can be injected from a fluid source through the fluid conduit 29 into the inlet port 27d. The cleaning fluid injected into the inlet port 27d can enter and/or fill the fluid distribution chamber 28. As discussed above, the cleaning fluid injected into the fluid distribution chamber 28 can be prevented from flowing into the interior of the casing 12 of the motor 10 by a sealing assembly 24 positioned around the output shaft 30 in the opening 15 of the tail end cap 16.

The discharge apertures 42 can permit the cleaning fluid to be distributed from within the fluid distribution chamber 28 in an outward direction toward the cooling fan 18. The cleaning fluid that flows from the chamber 28 through the discharge apertures 42 can remove dirt and undesired residues that can accumulate on the hub 60 or vanes 62 of the fan 18 during normal use of the motor 10. The cleaning fluid can also remove any undesired particles and/or residues from the interior surface of the fan shroud 17. The cleaning fluid can then exit through the apertures 19 of the fan shroud 17. As such, the electric motor 10 can be advantageously washed and cleaned without requiring disassembly of its components, such as the fan shroud 17 and the fan 18, unlike typical currently available electric motors.

From the foregoing, it should be apparent that the exemplary electric motor described herein improves upon conventional electric motors having a cooling fan by including an end plate and a chamber having an inlet port and a plurality of apertures for distributing a cleaning fluid from the chamber toward the cooling fan to clean the cooling fan. The exemplary electric motor further improves upon conventional electric motors by providing fan shroud standoffs at the interface between the fan shroud and the tail end cap to prevent typical metal-to-metal interfaces and crevices that can permit accumulation of undesired food particles, chemical residues, or dirt. The exemplary electric motor also improves upon conventional electric motors by providing an output shaft having a tapered interface with the cooling fan and a cooling fan having planar upper and lower surfaces to eliminate the pockets and crevices present in conventional fans. While a particular example of the electric motor has been illustrated and described, it should be apparent that modifications and variations can be made without departing from the spirit and scope of the inventions as defined by the following claims.

The invention claimed is:

1. An electric motor comprising:
    a housing having a casing positioned between a head end cap and a tail end cap;
    an output shaft passing through the head end cap and the tail end cap;
    a cooling fan mounted for rotation relative to the output shaft;
    a fluid distribution chamber adjacent the tail end cap;
    an inlet port to permit a supply of fluid to the chamber; and
    a plurality of discharge apertures for distributing fluid from the chamber toward the cooling fan.

2. The electric motor of claim 1, wherein the output shaft has a first end proximate the head end cap and a second end proximate the tail end cap, the second end of the output shaft including a tapered portion and the cooling fan including a complementary tapered bore configured to receive the tapered portion of the output shaft.

3. The electric motor of claim 2, further comprising a cap configured to attach to and cover a part of the tapered portion of the output shaft that protrudes from the tapered bore of the cooling fan.

4. The electric motor of claim 2, further comprising a means for limiting rotational motion of the tapered portion of the output shaft and the cooling fan relative to each another.

5. The electric motor of claim 2, further comprising a means for sealing the tapered bore of the cooling fan around the tapered portion of the output shaft.

6. The electric motor of claim 1, further comprising a plate coupled relative to the tail end cap to define the fluid distribution chamber therebetween, the plate including the plurality of discharge apertures for distributing fluid from the chamber toward the cooling fan.

7. The electric motor of claim 6, wherein the plate is positioned between the tail end cap and the cooling fan.

8. The electric motor of claim 1, wherein the cooling fan has a lower surface facing the tail end cap and an upper surface opposite the lower surface, at least one of the upper and lower surfaces being planar.

9. The electric motor of claim 8, wherein the upper and lower surfaces are parallel to one another.

10. The electric motor of claim 1, wherein the cooling fan has a plurality of vanes extending radially therefrom, each of the vanes having a longitudinal axis that is perpendicular to the longitudinal axis of the output shaft.

11. The electric motor of claim 10, wherein each of the vanes lies in a plane extending perpendicular to the longitudinal axis of the output shaft.

12. The electric motor of claim 1, further comprising a fan shroud mounted relative to the casing and enclosing the fan and the tail end cap.

13. The electric motor of claim 12, further comprising a plurality of non-metal spacers positioned between the fan shroud and an exterior surface of the tail end cap, each of the spacers including an opening configured to permit a fastener to pass therethrough.

14. The electric motor of claim 13, further comprising a plurality of fasteners passing through the fan shroud, the openings of the spacers, and the exterior surface of the tail end cap to secure the fan shroud to the tail end cap.

15. The electric motor of claim 13, wherein each of the spacers has continuously curved perimeter portions.

16. The electric motor of claim 13, wherein the spacers are made of a rubber material.

17. The electric motor of claim 13, wherein each of the spacers has a first end, a second end opposite the first end, a major axis passing through the first and second ends, and a minor axis transverse to the major axis and bisecting the spacer into two segments of equal lengths, a maximum width of each of the spacers increasing in a direction from at least one of the first and second ends toward the minor axis.

18. The electric motor of claim 17, wherein the major axes of the spacers are parallel to a longitudinal axis of the output shaft.

19. The electric motor of claim 12, wherein the fan shroud is located outside of the fluid distribution chamber.

20. The electric motor of claim 1, wherein a slinger seal is positioned about the shaft and adjacent to the fan.

21. A method of washing the electric motor of claim 1, comprising:
  injecting a pressurized fluid into the fluid distribution chamber;
  distributing the fluid from the chamber through the discharge apertures toward the cooling fan to wash the cooling fan.

22. The electric motor of claim 1, wherein the fluid is liquid and the motor is configured to isolate the liquid from an interior of the casing.

23. The electric motor of claim 1, wherein the tail end cap includes an outer circumferential wall surrounding a portion of the fluid distribution chamber, the inlet port being formed in the circumferential wall.

24. The electric motor of claim 1, wherein the fluid distribution chamber is located between the tail end cap and the cooling fan.

25. The electric motor of claim 1, wherein the casing has an interior and the inlet port is located so as to not be in fluid communication with the interior of the casing such that the fluid is isolated from the interior of the case.

* * * * *